(12) United States Patent
Urabe et al.

(10) Patent No.: US 11,347,759 B2
(45) Date of Patent: May 31, 2022

(54) PRESENTATION DEVICE, PRESENTATION METHOD AND PRESENTATION PROGRAM

(71) Applicant: Nippon Telegraph and Telephone Corporation, Tokyo (JP)

(72) Inventors: Yuki Urabe, Tokyo (JP); Shiro Ogasawara, Tokyo (JP); Kentaro Hotta, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/965,916

(22) PCT Filed: Feb. 1, 2019

(86) PCT No.: PCT/JP2019/003725
§ 371 (c)(1),
(2) Date: Jul. 29, 2020

(87) PCT Pub. No.: WO2019/151502
PCT Pub. Date: Aug. 8, 2019

(65) Prior Publication Data
US 2021/0049180 A1    Feb. 18, 2021

(30) Foreign Application Priority Data
Feb. 2, 2018    (JP) .............................. JP2018-016984

(51) Int. Cl.
*G06F 16/2457*    (2019.01)
*G06F 16/93*    (2019.01)
(Continued)

(52) U.S. Cl.
CPC ...... *G06F 16/24578* (2019.01); *G06F 16/248* (2019.01); *G06F 16/93* (2019.01); *G06V 30/414* (2022.01)

(58) Field of Classification Search
CPC .................................................. G06F 16/3338
See application file for complete search history.

(56) References Cited

U.S. PATENT DOCUMENTS

| 2011/0185233 A1* | 7/2011 | Belluomini ........... G06F 11/079 714/37 |
| 2016/0239487 A1* | 8/2016 | Potharaju ........... G06F 16/24578 |
| 2017/0154104 A1 | 6/2017 | Chen et al. |

FOREIGN PATENT DOCUMENTS

| JP | 2013235369 | 11/2013 |
| JP | 2014106665 | 6/2014 |
| JP | 6124489 | 5/2017 |

OTHER PUBLICATIONS

Le et al., "Distributed Representations of Sentences and Documents," Proceeding of the 31st International Conference on Machine Learning, 2014, 32:1188-1196.
(Continued)

*Primary Examiner* — Hau H Hoang
(74) *Attorney, Agent, or Firm* — Fish & Richardson P.C.

(57) ABSTRACT

A document acquisition unit (15c) collects documents, a feature amount calculation unit (15d) calculates feature amounts of words included in the collected documents, a relevance calculation unit (15f) calculates relevances between the documents and words included in operation logs in a window operated by a user, using the calculated feature amounts of the words included in the documents, and a presentation unit (15g) presents, to the user, a predetermined number of the documents in an order of descending relevance, as related documents. In this manner, it is possible to present documents related to a user's operation to the user.

18 Claims, 20 Drawing Sheets

(51) Int. Cl.
    G06F 16/248    (2019.01)
    G06V 30/414    (2022.01)

(56) References Cited

OTHER PUBLICATIONS

Leskovec et al., "Mining of Massive Datasets." Cambridge University Press, 2014, 513 pages.
Nutch.apache.org, [online], "Apache Nutch News," Apr. 2, 2017, retrieved on Dec. 21, 2017, retrieved from URL<http://nutch.apache.org/>, 11 pages.
Radimrehurek.com, [online], "Who is using Gensim?," 2009, retrieved on Dec. 21, 2017, retrieved from URL<https://radimrehurek.com/gensim>, 2 pages.
Seasar.org, [online], "S2Robot," 2009, retrieved on Dec. 21, 2017, retrieved from URL<http://s2robot.sandbox.seasar.org/ja/>, 3 pages. English Abstract.
Taku910.github.io, [online], "MeCab: Yet Another Part-of-Speech and Morphological Analyzer," available no later than Feb. 2, 2018, retrieved on Dec. 21, 2017, retrieved from URL<http://taku910.github.io/mecab/>, 13 pages (with English Translation).

* cited by examiner

APPLICATION ACCEPTING SYSTEM

NAME  HANAKO DENDEN

ADDRESS  1-1, HINODE-CHO, YOKOSUKA-SHI

SERVICE  SERVICE A ▽

REMARKS

CONSTRUCTION IS SCHEDULED FROM DECEMBER.

Fig. 2

| FILE NAME/WEBSITE WINDOW TITLE NAME | LINK DESTINATION | PAGE/ SHEET | WORD | FEATURE AMOUNT |
|---|---|---|---|---|
| ○○ MANUAL | ¥¥folderA¥folderB¥ ○○manual.pptx | 5 | CONSTRUCTION | 0.75 |
| △△ OPERATION METHOD | www.△△service.co.jp/ unyou_manual | - | SERVICE | 0.82 |
| CAUTION STATEMENT FOR □□ SERVICE | ¥¥folderA¥folderC¥ CAUTION STATEMENT¥CAUTION STATEMENT FOR □□ SERVICE.xlsx | 1 | CAUTION | 0.35 |

| DOCUMENT A<br>OPERATION<br>MANUAL | WORDS INCLUDED IN DOCUMENT A<br>{APPLICATION, ACCEPTANCE, NAME, FULL-WIDTH, SPACE, ADDRESS, ACCEPTANCE} |
|---|---|
| DOCUMENT B<br>CAUTION<br>STATEMENT<br>RELATED TO<br>SERVICE A | WORDS INCLUDED IN DOCUMENT B<br>{APPLICATION, SERVICE A, CAMPAIGN, SALE, NOT-APPLIED} |

(b) TF, IDF, TF-IDF OF DOCUMENT A

| WORD | NUMBER OF<br>APPEARANCES OF WORDS<br>TF= ─────────────────<br>TOTAL NUMBER OF WORDS<br>IN DOCUMENT | IDF= ln( TOTAL NUMBER OF<br>DOCUMENTS<br>─────────────── )+1<br>NUMBER OF DOCUMENTS<br>INCLUDING WORDS | TF-IDF |
|---|---|---|---|
| APPLICATION | 0.14 | 1 | 0.14 |
| ACCEPTANCE | 0.29 | 1.70 | 0.48 |
| NAME | 0.14 | 1.70 | 0.24 |
| FULL-WIDTH | 0.14 | 1.70 | 0.24 |
| SPACE | 0.14 | 1.70 | 0.24 |
| ADDRESS | 0.14 | 1.70 | 0.24 |

TF, IDF, AND TF-IDF OF DOCUMENT B

| WORD | NUMBER OF<br>APPEARANCES OF WORDS<br>TF= ─────────────────<br>TOTAL NUMBER OF WORDS<br>IN DOCUMENT | IDF= ln( TOTAL NUMBER OF<br>DOCUMENTS<br>─────────────── )+1<br>NUMBER OF DOCUMENTS<br>INCLUDING WORDS | TF-IDF |
|---|---|---|---|
| APPLICATION | 0.20 | 1 | 0.20 |
| SERVICE A | 0.20 | 1.70 | 0.34 |
| CAMPAIGN | 0.20 | 1.70 | 0.34 |
| SALE | 0.20 | 1.70 | 0.34 |
| NOT-APPLIED | 0.20 | 1.70 | 0.34 |

(c)

| DOCUMENT | WORD | TF-IDF |
|---|---|---|
| DOCUMENT A | APPLICATION | 0.14 |
| DOCUMENT A | ACCEPTANCE | 0.48 |
| DOCUMENT A | NAME | 0.24 |
| DOCUMENT A | FULL-WIDTH | 0.24 |
| DOCUMENT A | SPACE | 0.24 |
| DOCUMENT A | ADDRESS | 0.24 |
| DOCUMENT B | APPLICATION | 0.20 |
| DOCUMENT B | SERVICE A | 0.34 |
| DOCUMENT B | CAMPAIGN | 0.34 |
| DOCUMENT B | SALE | 0.34 |
| DOCUMENT B | NOT-APPLIED | 0.34 |

Fig. 6

| WORK TARGET WINDOW | DOCUMENT LINK DESTINATION | PAGE/ SHEET | RELEVANCE |
|---|---|---|---|
| Log_1.xml | ¥¥folderA¥folderB¥ ○○Manual.pptx | 5 | 0.92 |
| Log_1.xml | www. △△service.co.jp /unyou_manual | - | 0.24 |
| Log_2.xml | ¥¥folderA¥folderC¥ CAUTION STATEMENT¥CAUTION STATEMENT FOR □□ SERVICE.xlsx | 1 | 0.78 |

PRESENTATION DEVICE, PRESENTATION METHOD AND PRESENTATION PROGRAM

CROSS-REFERENCE TO RELATED APPLICATIONS

This application is a National Stage application under 35 U.S.C. § 371 of International Application No. PCT/JP2019/003725, having an International Filing Date of Feb. 1, 2019, which claims priority to Japanese Application Serial No. 2018-016984, filed on Feb. 2, 2018. The disclosure of the prior application is considered part of the disclosure of this application, and is incorporated in its entirety into this application

TECHNICAL FIELD

The present invention relates to a presentation apparatus, a presentation method, and a presentation program.

BACKGROUND ART

In general, operation tasks in companies are required to be efficiently carried out by operators quickly and accurately inputting necessary information to input screens of operation systems (hereinafter, also referred to as OpS) or the like. However, it may be difficult to memorize all tasks in short periods of time since some tasks require complicated operation methods. It is also difficult to learn tasks that are less frequently carried out due to fewer opportunities for these operations. Operators perform operations for such tasks with reference to related information as needed.

On the other hand, task related information such as operation methods and caution statements may be updated or notified daily or may be saved in various locations. As such, it is difficult for operators to know where information is present, it takes time and effort to find information, and reworking occurs due to missing of information or failures of checking, which leads to inefficient operations.

Thus, shortcuts to files are created, administrators manage information such that users can easily find folders, web pages, and the like, and search engines/frequently asked questions (FAQs) are provided, for example, in the related art in order to eliminate the burden on operators, namely users of the OpS trying to find where information is saved. Also, documents related to users' current operations are found and related documents are extracted from documents with records of viewing in operation logs in the past and are displayed in conjunction with the operations by being presented during similar operations or by operation screens being attached to the related documents in order to prevent missing of information and failures of checking.

NPL 1 and 2 disclose crawling in which a program follows links on the Internet, patrols websites, and copies and saves information on web pages in a robot-type search engine. NPL 3 discloses morphological analysis for dividing a document into words. NPL 4 discloses term frequency-inverse document frequency (TF-IDF) representing features of words in a document. NPL 5 discloses Doc2Vec for vectorizing a document. NPL 6 discloses gensim, which is a scalable machine learning library targeted mainly at text analysis.

CITATION LIST

Non Patent Literature

NPL 1: "S2Robot", [online], 2017, [Searched on Dec. 21, 2017], Internet <URL: http://s2robot.sandbox.seasar.org/ja/>

NPL 2: "Notch", [online], 2017, [Searched on Dec. 21, 2017], Internet <URL: http://nutch.apache.org>

NPL 3: "MeCab", [online], 2017, [Searched on Dec. 21, 2017], Internet <URL: http://taku910.github.io/mecab/>

NPL 4: Jure Leskovec, Anand Rajaraman, Jeffrey D. Ullman, "Mining of Massive Datasets", Cambridge University Press, 2014, pp. 1-340

NPL 5: Quoc Le, Tomas Mikolov, "Distributed Representations of Sentences and Documents", Proc. of the 31st international Conference on Machine Learning, PMLR 32(2), 2014, pp. 1188-1196

NPL 6: "gensim", [online], 2017, [Searched on Dec. 21, 2017], Internet <URL: https://radimrehurek.com/gensim/>

SUMMARY OF THE INVENTION

Technical Problem

However, it may be difficult to present information related to a user's operation to the user in the related art. For example; even if a shortcut to a file is created, it is necessary to update a link when link rot has occurred. Also, an administrator has to manually manage documents such that a user can easily access the documents. In a case of using search engines/FAQs, it is necessary for the user to enter appropriate keywords/questions representing current system operation statuses. According to the technology of presenting related documents from among documents with records of viewing in past operation logs, it may be possible to present the related documents only from the documents with records of viewing. Also, according to the technology of displaying related documents to which operation screens are attached in conjunction with operations, it is necessary to create documents to which operation screens are attached.

The present invention was made in view of the above circumstances, and an object thereof is to present documents related to a user's operation to the user.

Means for Solving the Problem

In order to solve the aforementioned problem and achieve the object, a presentation apparatus according to the present invention includes: a document acquisition unit configured to collect documents; a feature amount calculation unit configured to calculate feature amounts of words included in the collected documents; a relevance calculation unit configured to calculate relevances between the documents and words included in operation logs in a window operated by a user, using the calculated feature amounts of the words included in the documents; and a presentation unit configured to present, to the user, a predetermined number of the documents as related documents in an order of descending relevance.

Effects of the Invention

According to the present invention, it is possible to present documents related to a user's operation to the user.

BRIEF DESCRIPTION OF DRAWINGS

FIG. 2 is an explanatory diagram for explaining an overview of processing of the presentation apparatus according to the embodiment.

FIG. 5 is a diagram showing, as an example, a data configuration of a document learning unit.

FIG. 6 is an explanatory diagram for explaining processing of a feature amount calculation unit using TF-IDF.

DESCRIPTION OF EMBODIMENTS

Hereinafter, an embodiment of the present invention will be described in detail with reference to drawings. Note that the present invention is not limited by the embodiment. Also, the same components in description of the drawings will be represented with the same reference signs.

Outline of Processing of Presentation Apparatus

Figure 1:
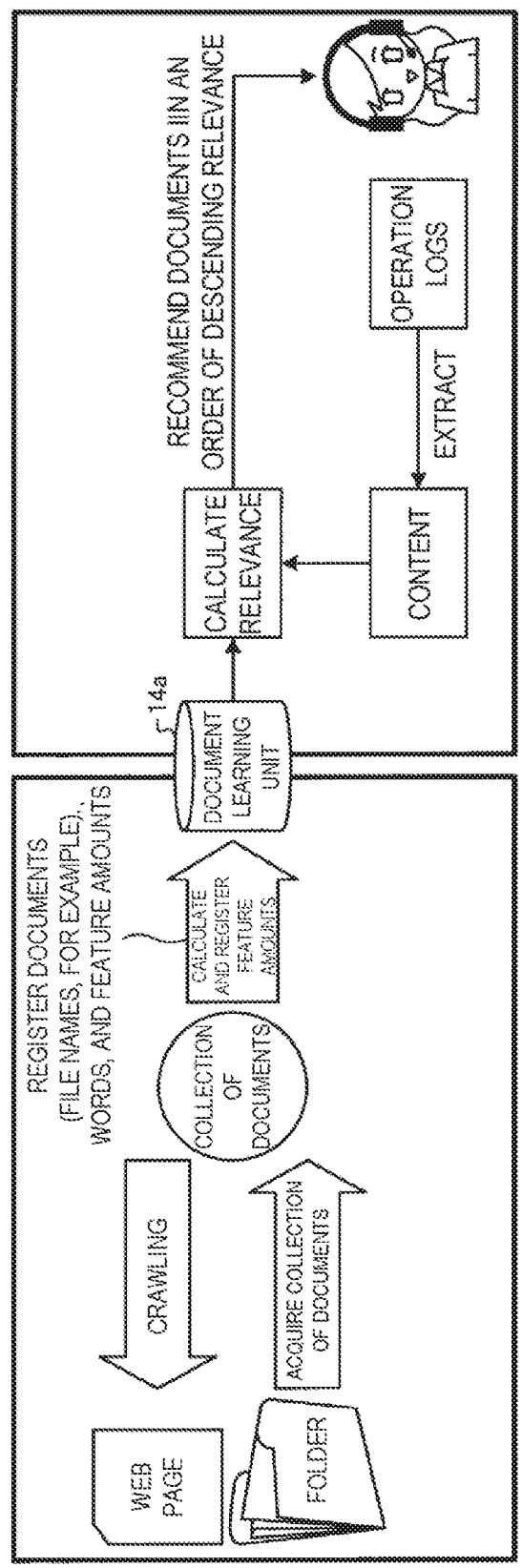
FIG. 1 is an explanatory diagram for explaining an overview of processing of a presentation apparatus according to an embodiment.
Figure 3:
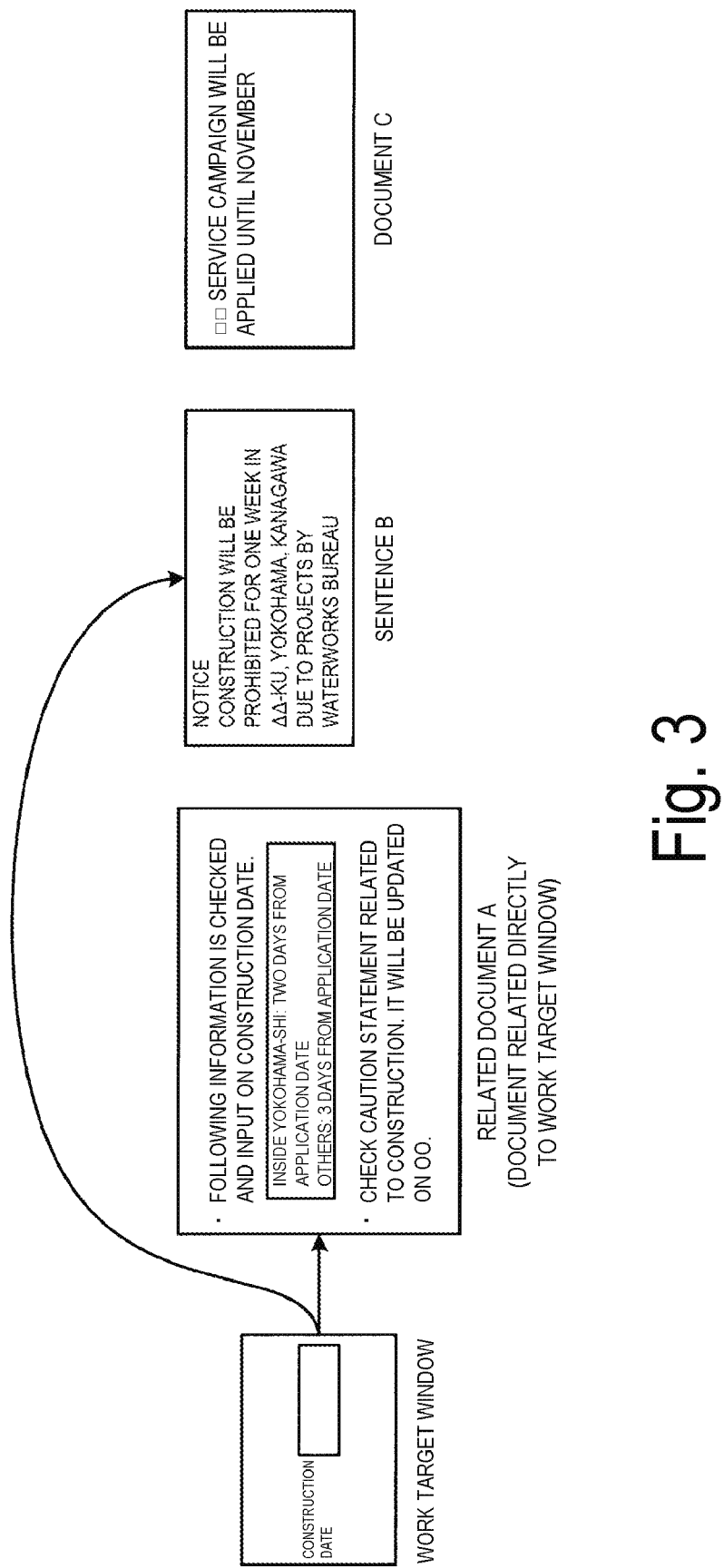
FIG. 3 is an explanatory diagram for explaining an overview of processing of the presentation apparatus according to the embodiment.

FIG. 1 to FIG. 3 are explanatory diagrams for explaining an outline of processing of a presentation apparatus according to the embodiment. First, as shown in FIG. 1, the presentation apparatus collects documents from web pages on the Internet, folders, and the like using crawling technologies, for example, and acquires a collection of documents as targets of processing. The presentation apparatus calculates feature amounts of the respective words in the documents, such as file names, and registers the feature amounts in an associated manner with the documents and the words in a document learning unit 14a.

The presentation apparatus acquires operation logs in a window operated by a user (hereinafter, also referred to as a work target window) and calculates relevances to the documents in the document learning unit using words included in the content of the operation logs. The presentation apparatus then presents, to the user, documents in an order of descending relevance as related documents.

Here, as shown as an example in FIG. 2, the work target window includes, for example, text information including item names such as "name" and "address" of the OpS and details of entry by the user such as "Hanako Denden" and "service A" as content. The presentation apparatus extracts a word as a target of processing from the text information.

Thus, according to the presentation apparatus, a document with a high relevance to the words "construction date" is presented to the user as a related document in a case in which the item name at user's location of entry is "construction date", for example, as shown as an example in FIG. 3 In the example shown in FIG. 3, a related document A is presented to the user.

Note that according to the presentation apparatus, high relevances are also calculated for documents including other words with high relevances that frequently appear at the same time in the same sentence or document, for example, even if the word that is the same as the word as a target of processing is not included, as will be described later. This enables, for example, presentation of a document B shown as an example in FIG. 3 as a related document with a higher relevance than that of a document C.

Configuration of Presentation Apparatus

Figure 4:
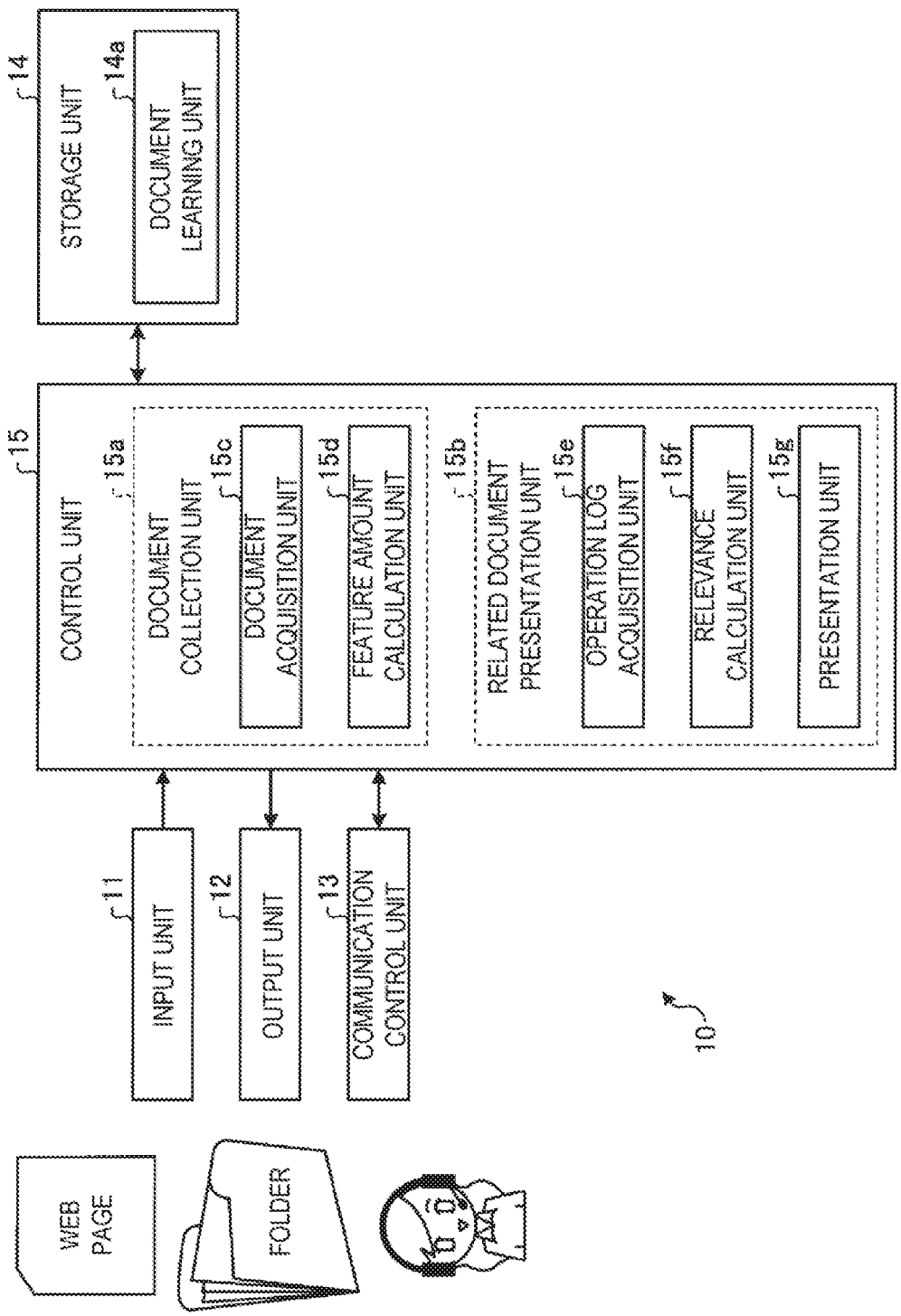
FIG. 4 is a schematic diagram showing, as an example, a schematic configuration of the presentation apparatus according to the embodiment.

FIG. 4 is a schematic view showing, as an example, a schematic configuration of the presentation apparatus according to the embodiment. As shown as an example in FIG. 4, the presentation apparatus 10 is implemented by a general-purpose computer such as a personal computer and includes an input unit 11, an output unit 12, a communication control unit 13, a storage unit 14, and a control unit 15.

The input unit 11 is implemented using an input device such as a keyboard or a mouse, and inputs various kinds of command information, such as a start of processing, to the control unit 15 in response to operator's input operations. The output unit 12 is implemented by a display device such as a liquid crystal display, a print device such as a printer, or the like.

The communication control unit 13 is implemented by a network interface card (NIC) or the like and controls communication between the control unit 15 and an external device such as a user terminal via an electric communication line such as a local area network (LAN) or the Internet.

The storage unit 14 is realized by a semiconductor memory device such as a random access memory (RAM) or a flash memory or a storage device such as a hard disk or an optical disc. The storage unit 14 stores, in advance a processing program for causing the presentation apparatus 10 to operate, data used for executing the processing program, and the like or, in a transitory manner, stores the processing program, the data, and the like every time processing is performed. Note that the storage unit 14 may be configured to communicate with the control unit 15 via the communication control unit 13.

In the embodiment, the storage unit 14 includes the document learning unit 14a. FIG. 5 is a diagram showing, as an example, a data configuration in the document learning unit 14a. As shown in FIG. 5, information stored in the document learning unit 14a includes items such as "file name/website window title name", "link destination", "page/sheet", "word", and "feature amount".

The file name/website window title name is a name of each file/website, which is a document as a target of processing such as a ○○ manual, and is used to identify each file/website. The link destination is information indicating where each file/website is stored and is represented as, for example, "www.ΔΔservice.co.jp/unyou_manual". This "file name/website window title" and "link destination" can be acquired by S2Rbot, Nutch, or the like at the time of crawling.

The page/sheet is information identifying a part of each file/website. For example, the information is represented as a page in a case in which the document is a PDF document or an Office (registered trademark) Word document, the information is represented as a slide in a case in which the document is an Office Power Point document, and the information is represented as a sheet in a case in which the document is an Excel document. The word is a word in the document as the target of the processing extracted in processing, which will be described later, and is extracted from the document through morphological analysis. Also, the feature amount is a feature amount of the word and is calculated in processing, which will be described later.

FIG. 4 will now be described again. The control unit 15 is implemented using a central processing unit (CPU) or the like and executes the processing program stored in the memory. In this manner, the control unit 15 functions as a document collection unit 15a and a related document presentation unit 15b as shown as an example in FIG. 4. The document collection unit 15a includes a document acquisition unit 15c and a feature amount calculation unit 15d. The related document presentation unit 15b includes an operation log acquisition unit 15e, a relevance calculation unit 15f, and a presentation unit 15g.

Note that these functional units may be implemented by hardware, respectively, or some of the functional units may be implemented by different hardware. For example, the document collection unit 15a and the related document presentation unit 15b may be implemented in different hardware.

The document acquisition unit 15c collects documents. Specifically, the document acquisition unit 15c acquires a collection of documents as targets of processing via the input unit 11 or the communication control unit 13. For example, the document acquisition unit 15c periodically crawls shared folders, local folders, or websites, collects documents, and stores the documents in the document learning unit 14a. For example, S2Rbot or Nutch as an open source are used for the crawling, document paths, website URLs, document file names, website title names, and the like are thus acquired.

The feature amount calculation unit 15d calculates feature amounts of words included in the collected documents. Specifically, the feature amount calculation unit 15d calculates feature amounts of the words included in the documents that the document acquisition unit 15c has collected. Also, the feature amount calculation unit 15d stores the calculated feature amounts in the document learning unit 14a in an associated manner with the documents.

Specifically, the feature amount calculation unit 15d separates text information in each of the documents in the document learning unit 14a into words through morphological analysis first.

Next, the feature amount calculation unit 15d calculates TF-IDF as feature amounts on the basis of the number of appearances of the words included in the documents, for example. In other words, the feature amount calculation unit 15d calculates TF-IDF of the respective words appearing in each document from the collection of documents as the feature amounts.

Here, FIG. 6 is an explanatory diagram for explaining processing of the feature amount calculation unit 15d using TF-IDF. As shown as an example in FIG. 6, the feature amount calculation unit 15d calculates TF-IDF for the respective words included in the respective documents. TF is a value obtained by dividing the number of appearances of each word by the total number of words in each document and represents an appearance frequency of the word. IDF is a value obtained by adding 1 to a logarithm of a value obtained by dividing the total number of documents by the number of documents including the word and decreases as the number of documents in which the word is commonly used increases. TF-IDF is a product of TF and IDF.

In the example shown in FIG. 6, calculation has been made for "application" such that TF=0.14, IDF=1, and TF-IDF=0.14 are satisfied as shown in (b) of FIG. 6 among words included in the document A shown in (a) of FIG. 6, for example. In this case, the document "document A", the word "application", and TF-IDF "0.14" are registered in the document learning unit 14a in an associated manner as shown in (c) of FIG. 6.

Note that feature amount calculation unit 15d can also calculate the feature amounts of words by applying the method of Doc2Vec. In such a case, the feature amount calculation unit 15d calculates the feature amounts on the basis of distribution expression in which the words included in the documents are represented as high-dimension vectors.

Figure 7:
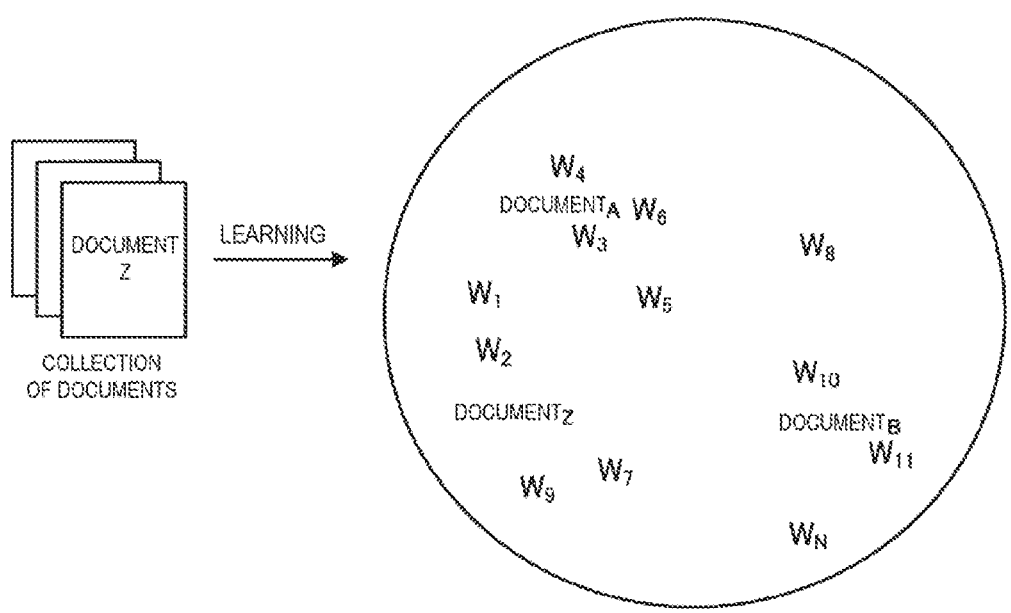
FIG. 7 is an explanatory diagram for explaining processing of the feature amount calculation unit using Doc2Vec.

Here, FIG. 7 is an explanatory diagram for explaining processing of the feature amount calculation unit 15d using Doc2Vec. In Doc2Vec, relationships between documents and words in the documents in terms of meanings are expressed in a vector space as feature amounts of the words in the documents as shown as an example in FIG. 7 on the assumption that "words used in the same context tend to have similar meanings."

If sentences "I walk with my pet dog" and "I walk with my pet cat" are learned by Doc2Vec, for example, "dog" and "cat" are used in the same context, a similarity between "dog" and "cat" is thus evaluated to be high, and the words are evaluated to have similar meanings. The example shown in FIG. 7 shows that a document$_Z$ include a larger collection of similar words to those in a document$_A$ than in a document$_B$, for example.

In this case, the feature amount calculation unit 15d learns features of the collection of documents and create models representing relationships between words, between words and documents, and between documents. Also, the feature amount calculation unit 15d registers the created models in the document learning unit 14a.

Note that according to Doc2Vec, it is possible to perform vectorization in predetermined units, such as in units of sentences, pages, or files. Also, Doc2Vec is implemented using gensim, which is an open source API, for example.

The operation log acquisition unit 15e acquires operation logs in the format of an xml file, for example, in a work target window operated by the user via the input unit 11 or the communication control unit 13.

The relevance calculation unit 15f calculates relevances between documents and words included in the operation logs in the window operated by the user using the calculated feature amounts of the words included in the documents.

Figure 8:
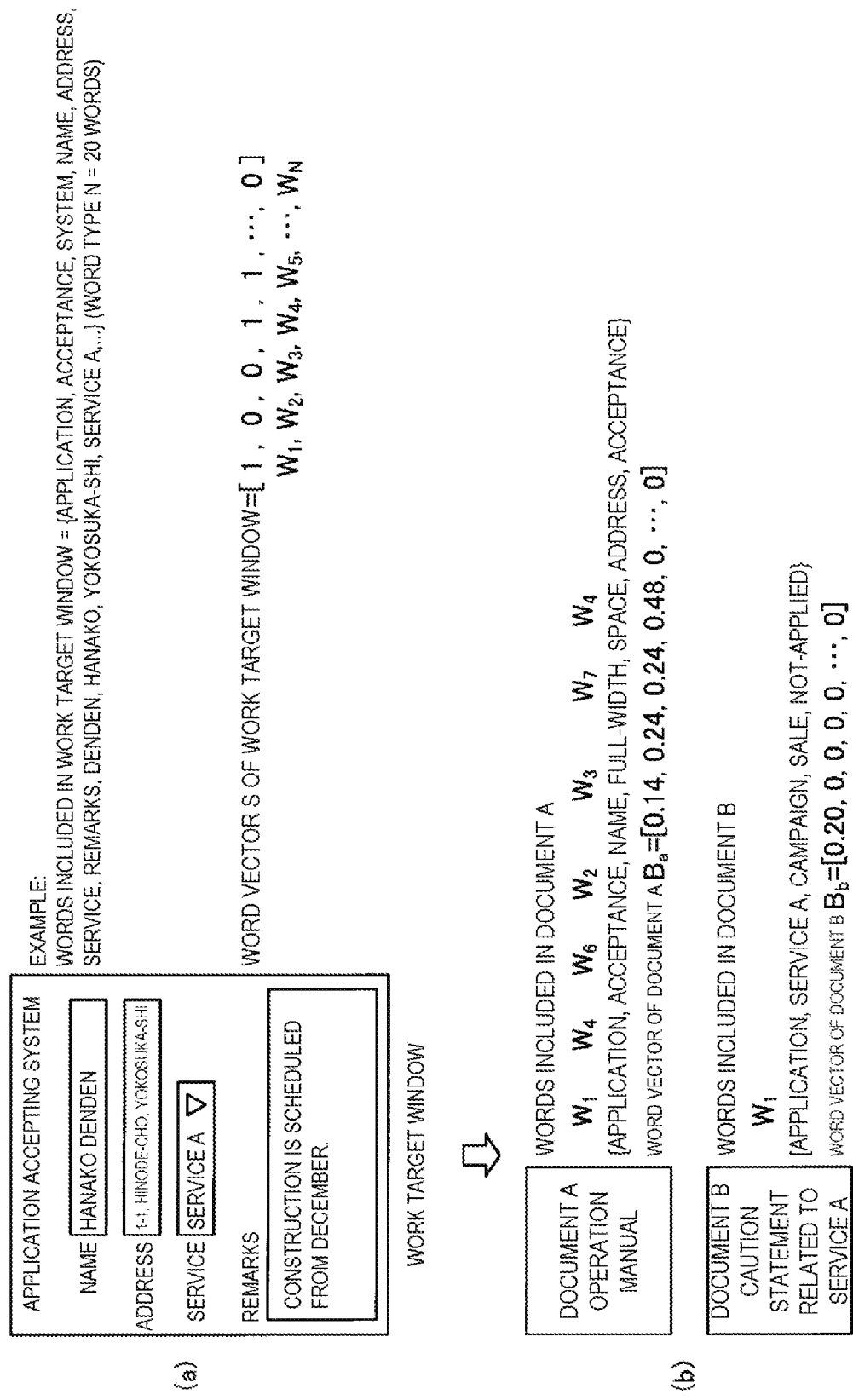
FIG. 8 is an explanatory diagram for explaining processing of a relevance calculation unit.
Figure 9:
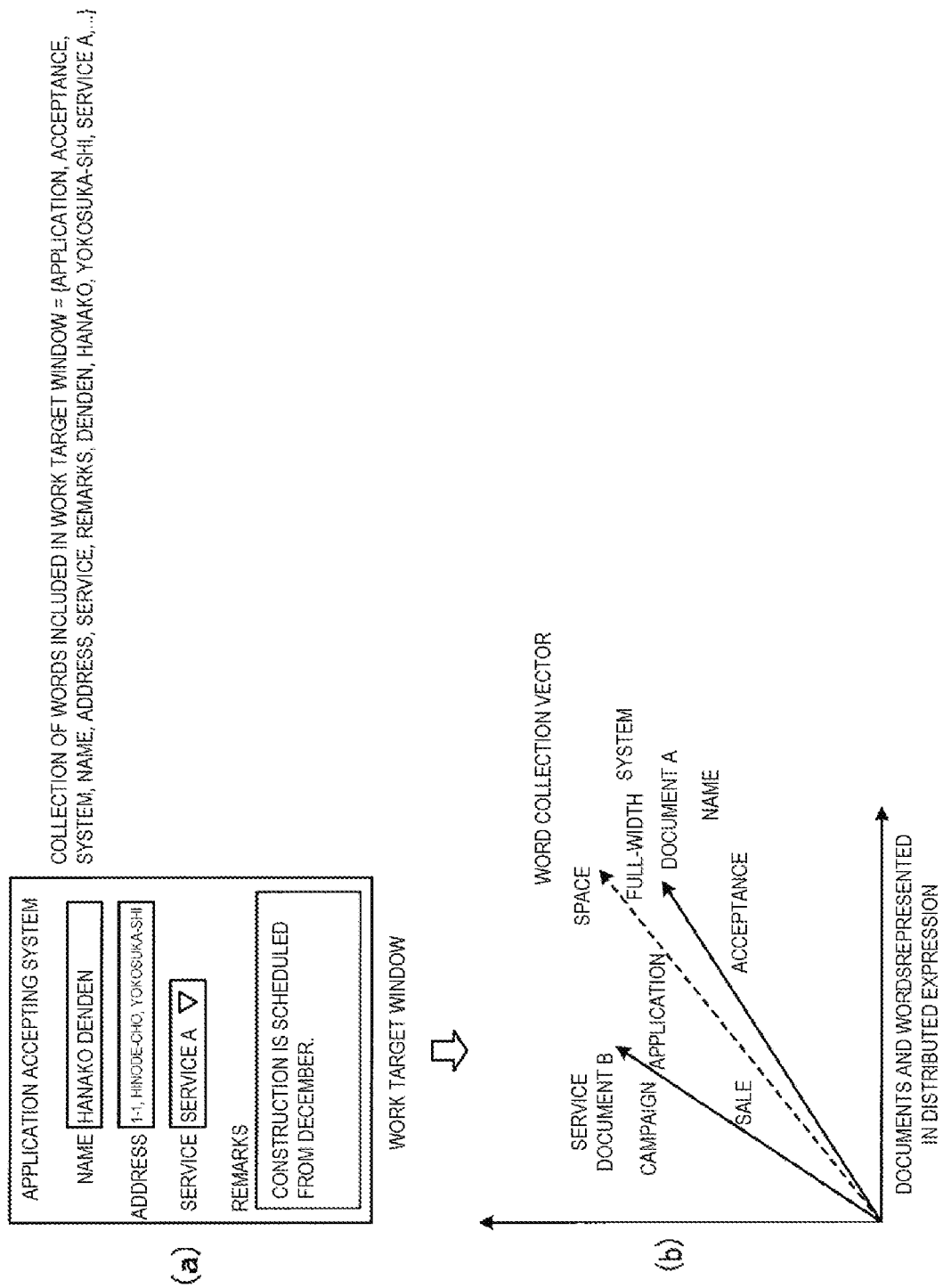
FIG. 9 is an explanatory diagram for explaining processing of the relevance calculation unit.
Figure 10:
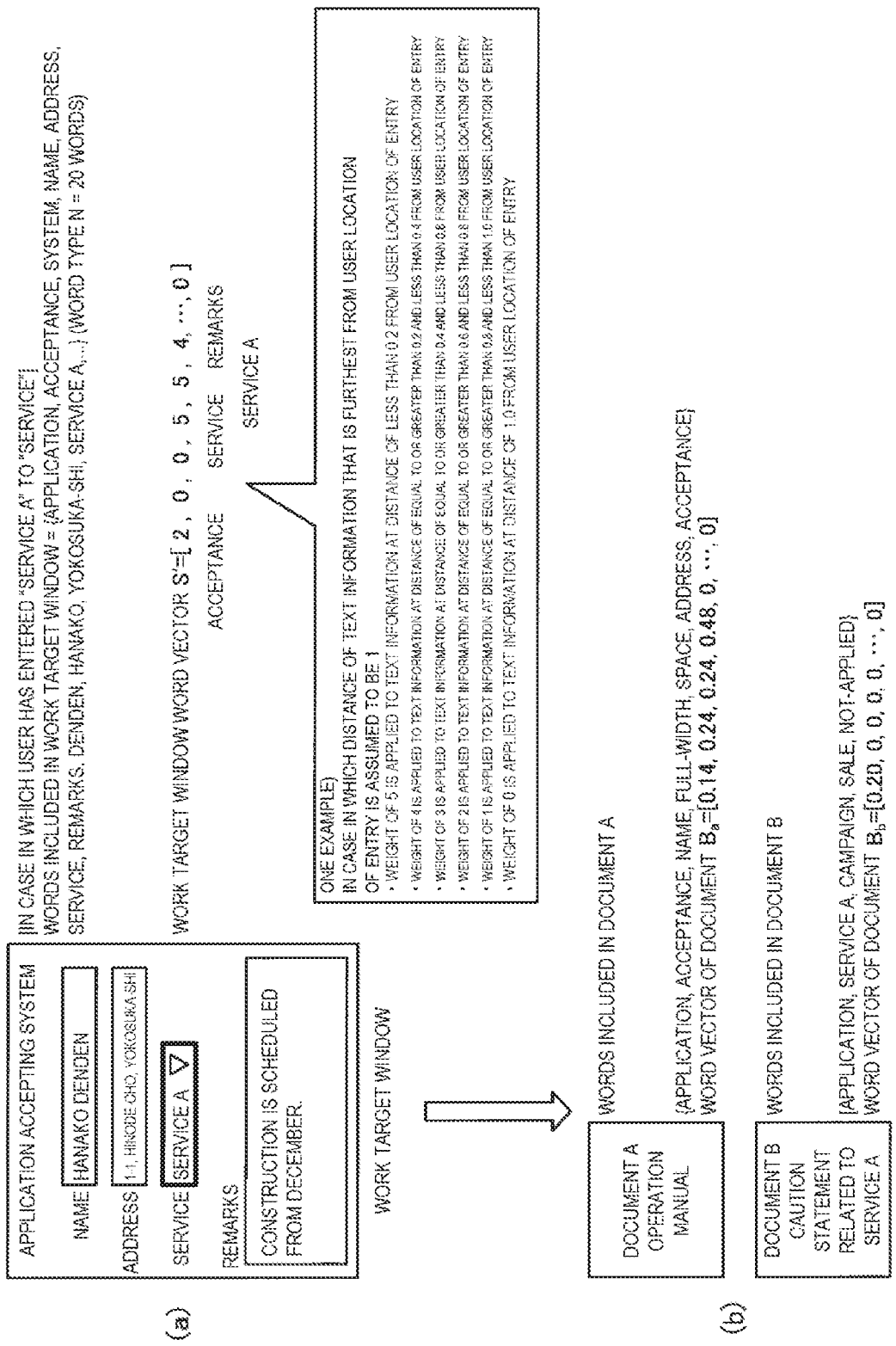
FIG. 10 is an explanatory diagram for explaining processing of the relevance calculation unit.

Here, FIG. 8 to FIG. 10 are explanatory diagrams for explaining processing of the relevance calculation unit 15f. First, FIG. 8 shows, as an example, processing of the relevance calculation unit 15f in a case in which feature amounts are calculated using TF-IDF (see FIG. 6). In this case, the relevance calculation unit 15f extracts words included in text information in operation logs in the work target window through morphological analysis and creates word vectors S as shown in (a) of FIG. 8.

The dimension of the word vectors S is a total number of types of words appearing in the collection of documents, and a value of elements corresponding to the words included in the operation logs is 1, and a value of the other elements is 0. In the example shown in (a) of FIG. 8, for example, a value of an element W corresponding to the word "application" included in the operation logs is 1.

Next, the relevance calculation unit 15f calculates relevances between word vectors S in the operation logs in the work target window and the respective documents in the document learning unit 14a as shown in (b) of FIG. 8. In other words, the relevance calculation unit 15f creates word vectors B of the documents using the words included in the documents in the document learning unit 14a and the feature amounts of the respective words.

The dimension of the word vectors B in the documents is similar to that of the word vectors S, a value of elements corresponding to the words included in the documents is the feature amount (TF-IDF value), and a value of the other elements is 0, in the example shown in (b) of FIG. 8, the feature amount of the element $W_1$ corresponding to the word "application" among the words included in the document A is 0.14, for example.

The relevance calculation unit 15f calculates relevances between the word vectors B of the documents and the word vectors S of the operation logs. The Euclidean distance, the cosine similarity, the Jaccard distance, or the like can be applied as a method for calculating the relevances. In a case in which the cosine similarity is employed as the method for calculating the relevances, for example, a relevance between the word vectors S and the word vectors $B_a$ in the document A or the word vectors $B_b$ in the document B shown in (b) of FIG. 8 is calculated by Equation (1) below.

[Math. 1]

$$Sim(S, B_a) = \frac{S \cdot B_a}{|S||B_a|} = 0.40 \qquad (1)$$

$$Sim(S, B_b) = \frac{S \cdot B_b}{|S||B_b|} = 0.19$$

FIG. 9 shows processing of the relevance calculation unit 15f in a case in which feature amounts have been calculated using Doc2Vec (see FIG. 7). In this case, the relevance calculation unit 15f extracts text information in operation logs in the work target window and converts the text information into a collection of words through morphological analysis as shown in (a) of FIG. 9.

Next, the relevance calculation unit 15f calculates relevances using a vector representing the collection of words and a vector of each document represented as a model by the document learning unit 14a as shown in (h) of FIG. 9. A vector representing a collection of words represented by the dashed-line arrow in (b) of FIG. 9 can be created using an infer_vector function of gensim, for example. The relevance calculation unit 15f calculates similarities, such as cosine similarities, between the vector representing the collection of words and the vector representing each document, as relevances. The example shown in (b) of FIG. 9 shows that the similarity of the $document_A$ with the vector representing the collection of words is larger than that of the $document_B$ and the $document_A$ has a higher relevance.

Note that the relevance calculation unit 15f may calculate the relevances by applying larger weights to words at distances of equal to or less than a predetermined threshold value from a word input just before by the user on the window from among the words included in the operation logs. In a case in which a display position (x, y) of text information in the work target window and a location of entry made just before by the user are known, or in a case in which it is possible to predict the user location of entry, for example, relevances are calculated by applying weights to words in the vicinity of the location of entry. This enables acquisition of documents with high relevances between the location of entry and the words in the vicinity thereof as related documents.

In a case in which feature amounts are calculated using TF-IDF (see FIG. 6), for example, the relevance calculation unit 15f calculates relevances by applying a larger weight to words that are closer to the user location of entry among the respective words of the word vectors in the operation logs in the work window as shown in FIG. 10. Specifically, the relevance calculation unit 15f creates word vectors S' by applying larger weights to words that are closer to the location of entry made just before by the user as shown in (a) of FIG. 10 for the respective elements of the word vectors S (see (a) of FIG. 8) of the operation logs in the work window.

In the example shown in (a) of FIG. 10, weights of 0 to 5 are applied to the respective words in a stepwise manner in accordance with the distance from the word at the user location of entry on the assumption that the distance calculated from the coordinates of the word at the user location of entry and the word that is the furthest from the location of entry is 1. For example, the weight of text information (word) at the closest distance of less than 0.2 from the user's location of entry is set to be 5.

In this case, the relevance calculation unit 15f calculates relevances to the respective documents in the document learning unit 14a similarly to the procedure shown in (b) of FIG. 8 using the created word vectors S'. In a case in which relevances are obtained as cosine similarities, for example, relevances between the word vectors S' and the word vectors $B_a$ in the document A or the word vectors $B_b$ in the document B shown in (b) of FIG. 10 are represented by Equation (2) below. Note that the ranges of distances and weights can appropriately be set.

[Math. 2]

$$Sim(S', B_a) = \frac{S' \cdot B_a}{|S'||B_a|} = 0.31 \qquad (2)$$

$$Sim(S', B_b) = \frac{S' \cdot B_b}{|S'||B_b|} = 0.22$$

In a case in which feature amounts have been calculated using Doc2Vec (see FIG. 7), the relevance calculation unit 15f extracts a collection of words within a predetermined range, which are physically closer to the user's location of entry, and calculates a relevance with respect to the collection of words, namely a similarity to the document vectors.

The similarity is calculated by a procedure similar to one shown in (b) of FIG. 9. The range of the collection of words can appropriately be set.

The presentation unit 15g presents, to the user, a predetermined number of documents in an order of descending relevance as related documents. Specifically, the presentation unit 15g outputs, to the output unit 12, document names or the like of the related documents in such a manner that the documents can be viewed in a list. In a case in which the user inputs an instruction for selecting any of the related documents output in such a manner that the documents can be viewed in a list, the presentation unit 15g acquires the selected related document from a storage location and outputs the related document to the output unit 12.

Presentation Processing

Figure 11:
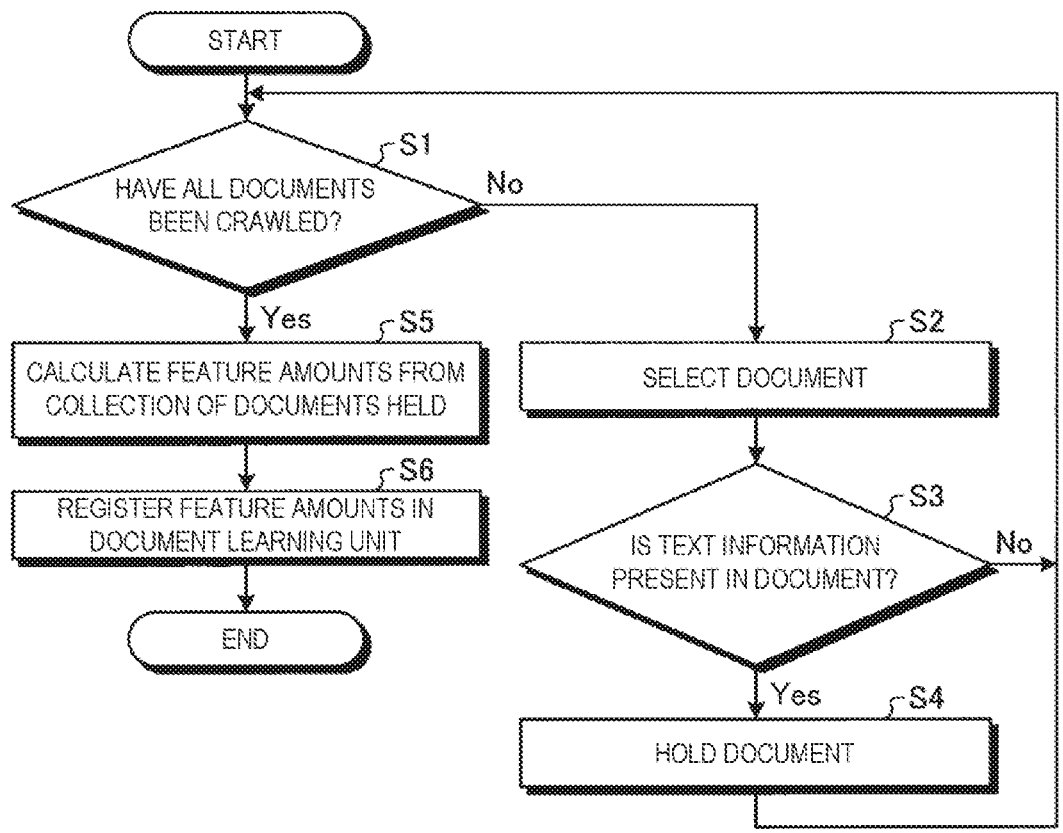
FIG. 11 is a flowchart showing a procedure for presentation processing performed by the presentation apparatus according to the embodiment.
Figure 12:
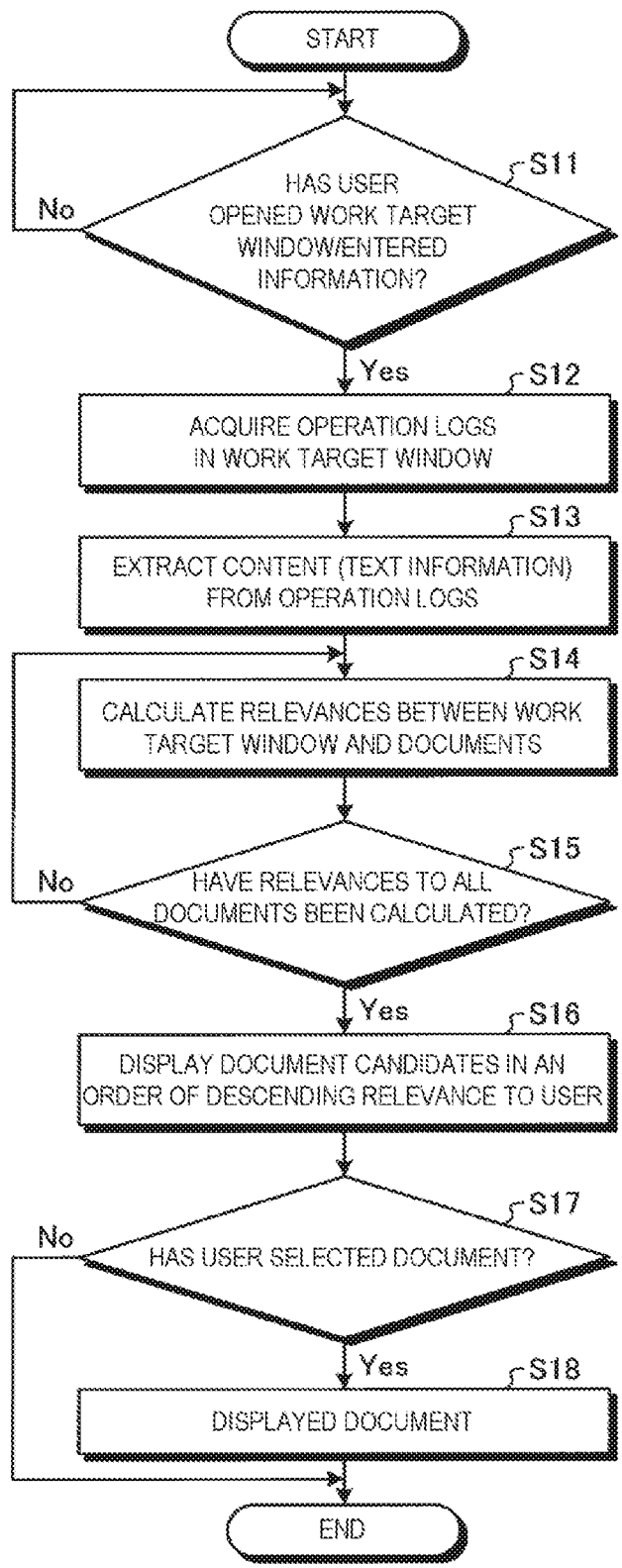
FIG. 12 is a flowchart showing a procedure for presentation processing performed by the presentation apparatus according to the embodiment.

FIG. 11 and FIG. 12 are flowcharts showing a procedure for presentation processing of the presentation apparatus 10 according to the embodiment. The presentation processing according to the embodiment includes document collection processing and related document presentation processing. The document collection processing and the related document presentation processing are not limited to a case in which the processing is performed in a temporally continuous manner and may be temporally separated.

First, FIG. 11 shows a document collection procedure for collecting a collection of documents as targets of processing. The flowchart in FIG. 11 is started at a timing at which an operation of instructing for a start is input, for example.

The document acquisition unit 15c periodically performs crawling to collect documents (Step S1). The document acquisition unit 15c further selects documents (Step S2) in a case in which crawling of target folders or websites has not ended (Step S1; No), and the document acquisition unit 15c holds documents (Step S4) and returns the processing back to Step S1 in a case in which text information is present in the documents (Step S3; Yes). If there is no text information in the documents (Step S3; No), the document acquisition unit 15c returns the processing back to Step S1.

In a case in which the crawling of the target folders or websites has ended (Step S1; Yes), the feature amount calculation unit 15d calculates feature amounts of the collection of documents held (Step S5) and registers the feature amounts in the document learning unit 14a (Step S6), In this manner, a series of document collection processes end.

FIG. 12 shows a related document presentation procedure for presenting related documents that are related to operation logs in the work target window that the user is operating from among a collection of documents as targets of processing. The operation log acquisition unit 15e periodically checks whether or not the user has opened the work target window or has entered information (Step S11) and waits until the work target window is opened or information is entered (Step S11; No), In a case in which the user has opened the work target window or has entered information (Step S11; Yes), the operation log acquisition unit 15e acquires operation logs in the work target window (Step S12).

Next, the relevance calculation unit 15f extracts text information from the operation logs and separates the text information into words (Step S13). Also, the relevance calculation unit 15f calculates relevances between the separate words and the documents in the document learning unit 14a (Step S14).

The relevance calculation unit 15f checks whether the relevances for all the documents in the document learning unit 14a have been calculated (Step S15). The relevance calculation unit 15f returns the processing back to Step S14 in a case in which the relevances for all the documents have not been calculated (Step S15; No), and moves on to the processing in Step S16 in a case in which the relevances for all the documents have been calculated (Step S15; Yes).

In the processing in Step S16, the presentation unit 150 displays a predetermined number of documents in an order of descending relevance as document candidates of the related documents to the user via the output unit 12 (Step S16). In a case in which the user has input an instruction for selecting one of the related documents displayed (Step S17; Yes), the presentation unit 15g acquires the selected document from the link destination and displays the selected document on the output unit 12 (Step S18). In this manner, or in a case in which the user has not input any instruction for selecting one of the related documents (Step S17; No), a series of related document presentation processes end.

As described above, the feature amount calculation unit 15d calculates feature amounts of words included the input documents in the presentation apparatus 10 according to the embodiment. Also, the relevance calculation unit 15f calculates relevances between the documents and the words included in operation logs in the window operated by the user, using the calculated feature amounts of the words included in the documents. The presentation unit 15g presents, to the user, a predetermined number of documents in an order of descending relevance as related documents.

This enables the presentation apparatus 10 to present the documents related to the user's operation to the user. For example, documents including another word with a high relevance that frequently appears at the same time in the same sentences or documents although the word that is the same as the word as a target of processing is not included are presented as related documents. Also, text information that is content in a user's OpS screen can be used to evaluate relevances to documents, thereby displaying ranking. This enables documents with no records of viewing to be displayed in ranking as targets of recommendation. Also, it is possible to recommend the related documents to the user in accordance with the ranking. This enables a current operation status of the system to be reflected in the ranking of the related documents without the user thinking any keyword or question. Also, documents to which no operation screens have been attached can be targets of recommendation. It is also possible for the user to find a target document from among the recommended documents without looking for documents at random.

Other Embodiments

Figure 13:
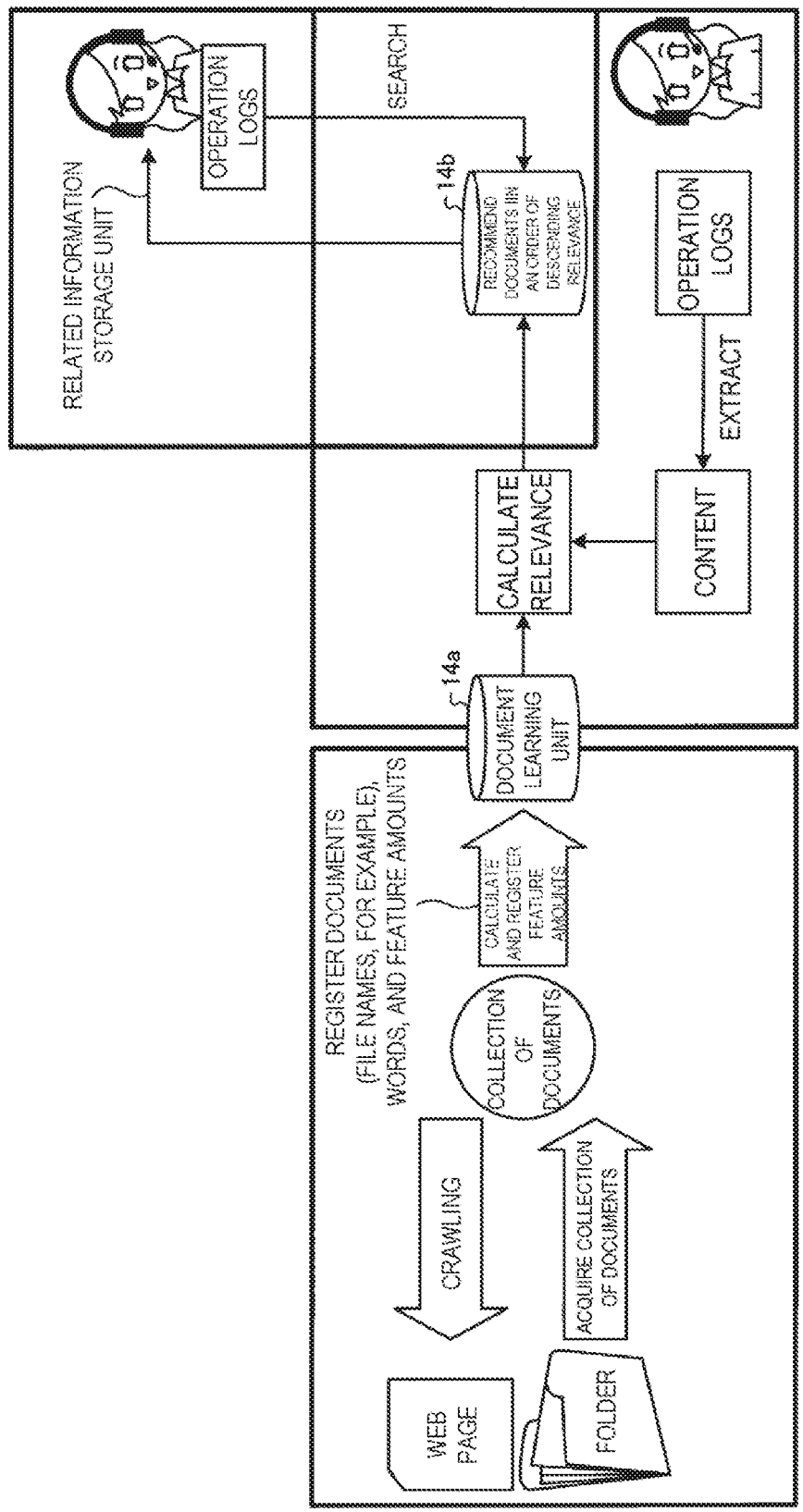
FIG. 13 is an explanatory diagram for explaining processing of a presentation apparatus according to another embodiment.

The present invention is not limited to the embodiment described above. FIG. 13 is an explanatory diagram for explaining processing of the presentation apparatus 10 according to another embodiment. As shown as an example in FIG. 13, for example, the relevance calculation unit 15f may accumulate calculated relevances to documents and operation logs in an associated manner in the related information storage unit 141) and calculate similarities between the operation logs and a newly input operation log with reference to the related information storage unit 14b. In such a case, the presentation unit 15g presents, to the user, documents associated with a predetermined number of operation logs in an order of descending similarity as related documents.

Figure 14:
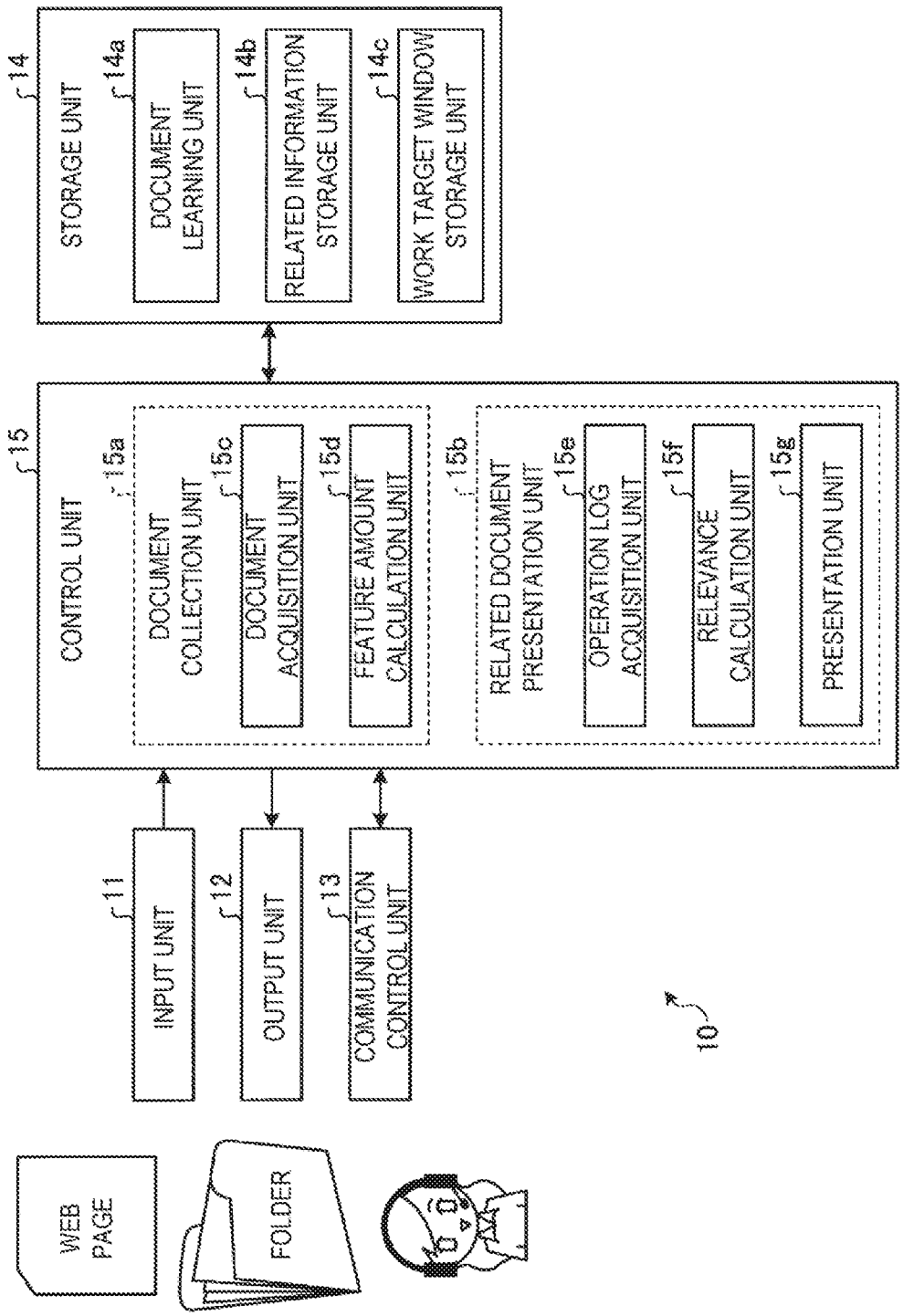
FIG. 14 is a schematic diagram showing, as an example, a schematic configuration of a presentation apparatus according to another embodiment.

FIG. 14 is a schematic view showing, as an example, a schematic configuration of a presentation apparatus according to another embodiment. As shown in FIG. 13 and FIG. 14, the presentation apparatus 10 according to the embodiment is different from the presentation apparatus 10 according to the aforementioned embodiment (see FIG. 1 and FIG. 4) in that a related information storage unit 14b is included. Also, the presentation apparatus 10 is different from that in the aforementioned embodiment in that relevances between documents in the document learning unit 14a and operation logs are calculated in advance and are accumulated in the related information storage unit 14b as shown in FIG. 13. This enables efficient presentation of the related documents to the user in a case in which an operation log that is being operated by the user is similar to the operation logs in the related information storage unit 14b.

Note that in this case, an operation log for calculating relevances to the documents in the document learning unit 14a may be stored in a work target window storage unit 14c and relevances between the respective operation logs and the documents may be calculated at an arbitrary timing thereafter. In this case, the work target window storage unit 14c is included in the storage unit 14 as shown in FIG. 14. In this manner, it is possible to perform the processing using a backyard, a processing load is thus distributed, and efficiency of presenting the related documents is improved.

Figures 15, 16:
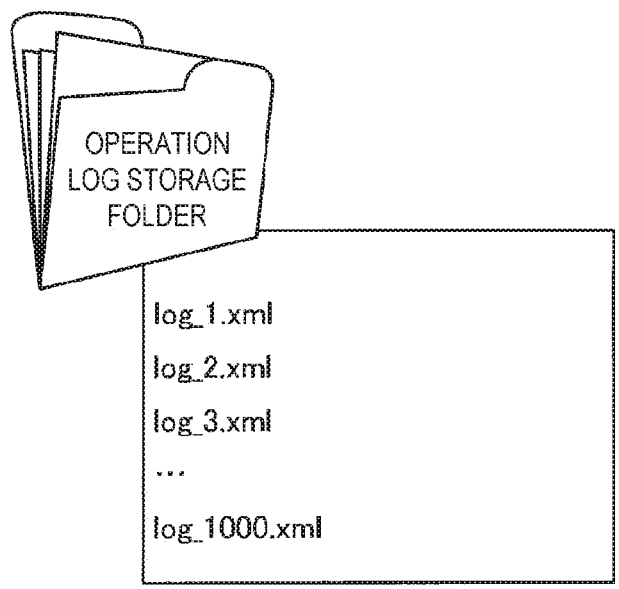
FIG. 15 is a diagram showing, as an example, a data configuration in a related information storage unit.
FIG. 16 is a diagram showing, as an example, a data configuration in a work target window storage unit.

Hereinafter, differences from the aforementioned embodiments will be described. Description of matters that are similar to those in the aforementioned embodiments will be omitted. First, FIG. 15 is a diagram showing, as an example, a data configuration in the related information storage unit 14b. As shown as an example in FIG. 15, information stored in the related information storage unit 14b includes "work target window", "document link destination", "page/sheet", "relevance", and the like.

The work target window is information for identifying each operation log and is represented by a file name in the format of xml, for example. The document link destination is information indicating where a document extracted as a document related to an operation log is stored, and the relevance indicates a relevance calculated for the related document. The example shown in FIG. 15 shows, as an example, that a document in 5 page/sheet with a link destination of "¥¥folderA¥folderB¥○○manual.pptx" among related documents in the work target window "log_1.xml" has a relevance of 0.92 with the operation log.

FIG. 16 is a diagram showing, as an example, a data configuration in the work target window storage unit 14c. As shown as an example in FIG. 16, an operation log in each work target window such as "log_1.xml" is stored in an operation log storage folder in the work target window storage unit 14c.

Figure 17:
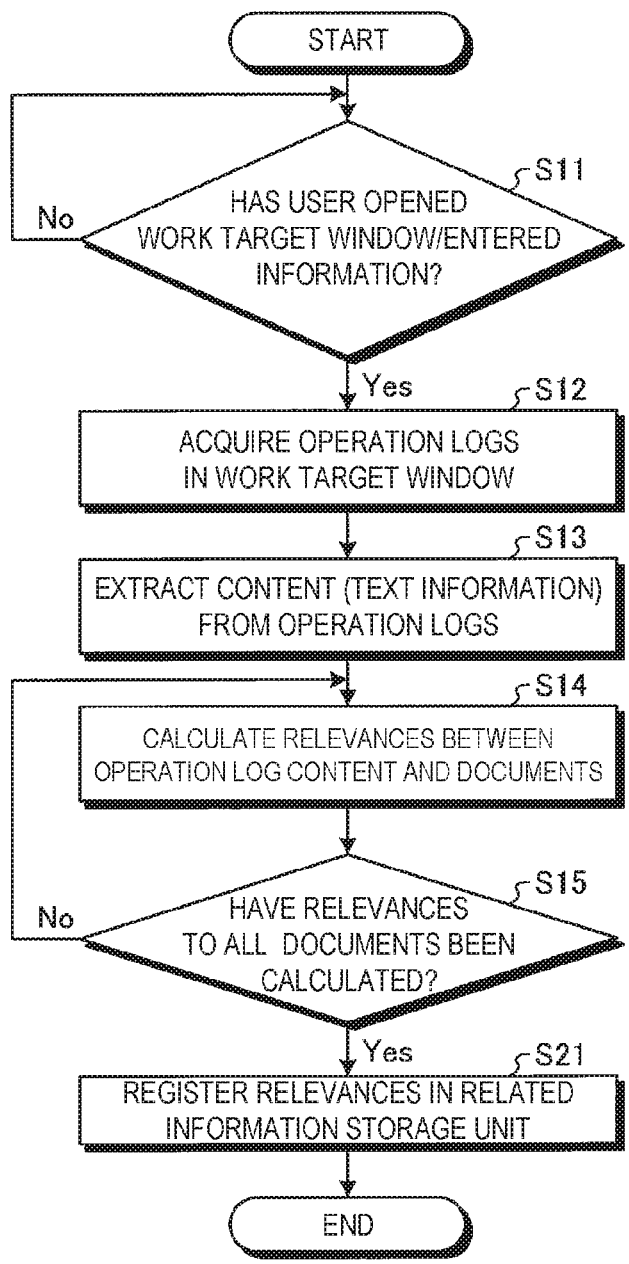
FIG. 17 is a flowchart showing a procedure for presentation processing performed by a presentation apparatus according to another embodiment.
Figure 18:
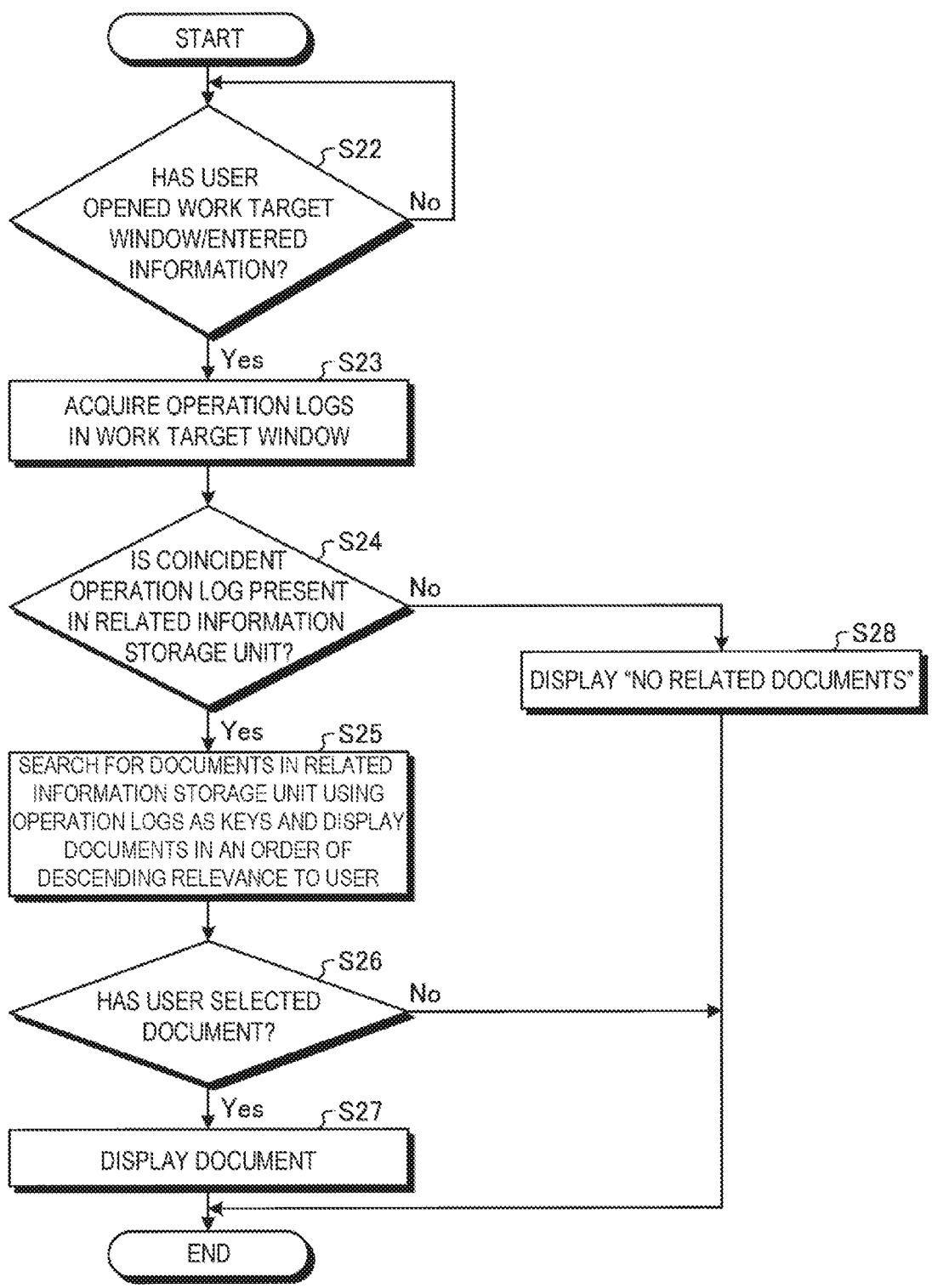
FIG. 18 is a flowchart showing a procedure for presentation processing performed by a presentation apparatus according to another embodiment.

Also, FIG. 17 and FIG. 18 are flowcharts showing a procedure for presentation processing of the presentation apparatus in this case. Document collection processing in the embodiment is similar to that in the aforementioned embodiment shown in FIG. 11, and FIG. 17 and FIG. 18 illustrate related document presentation processing. The related document presentation processing is different from that in the aforementioned embodiment shown in FIG. 12 in the processing in and after Step S15 shown in FIG. 17 and the processing shown in FIG. 18. Specifically, the related document presentation processing includes relevance calculation processing shown in FIG. 17 and related document acquisition processing shown in FIG. 18. The relevance calculation processing and the related document acquisition processing are not limited to a case in which the processing is performed in a temporally continuous manner and may be temporally separated.

First, since processing up to Step S15 in the relevance calculation processing shown in FIG. 17 is similar to the processing in FIG. 12, description thereof will be omitted. In a case in which relevances of all the documents have been calculated in the processing in Step S15 (Step S15; Yes), the relevance calculation unit 15f registers the calculated relevances to operation logs and documents in an associated manner in the related information storage unit 14b (Step S21), In this manner, the relevance calculation processing ends.

Next, the operation log acquisition unit 15e periodically checks whether or not the user has opened the work target window or has entered information (Step S22) and waits until the work target window is opened or has entered information (Step S22; No) as shown in FIG. 18 in the related document acquisition processing. In a case in which the user has opened the work target window or has entered information (Step S22; Yes), the operation log acquisition unit 15e acquires operation logs in the work target window (Step S23).

Next, the presentation unit 15g checks whether or not there are operation logs that are coincident with the acquired operation logs or that are similar to the acquired operation logs with similarities that are greater than a predetermined threshold value, with reference to the related information storage unit 14b (Step S24). In a case in which there are no operation logs that are coincident with or similar to the acquired operation logs (Step S24; No); the presentation unit 15g determines that there are "no related documents", displays it to the user via the output unit 12 (Step S28), and ends the series of related document acquisition processes.

On the other hand, in a case in which the presentation unit 15g confirms that there are operation logs that are coincident with or similar to the acquired operation logs (Step S24; Yes), the relevance calculation unit 15f searches for the documents in the related information storage unit 14b using the operation logs as keys and displays a predetermined number of documents in an order of descending relevance as document candidates of related documents to the user via the output unit 12 (Step S25). In a case in which the user has input an instruction for selecting one of the related documents displayed (Step S26; Yes), the presentation unit 15g acquires the selected document from the link destination and displays the selected document on the output unit 12 (Step S27). In this manner or in a case in which the user has not input any instruction for selecting one of the related documents (Step S26; No), the series of related document acquisition processes end.

Figure 19:
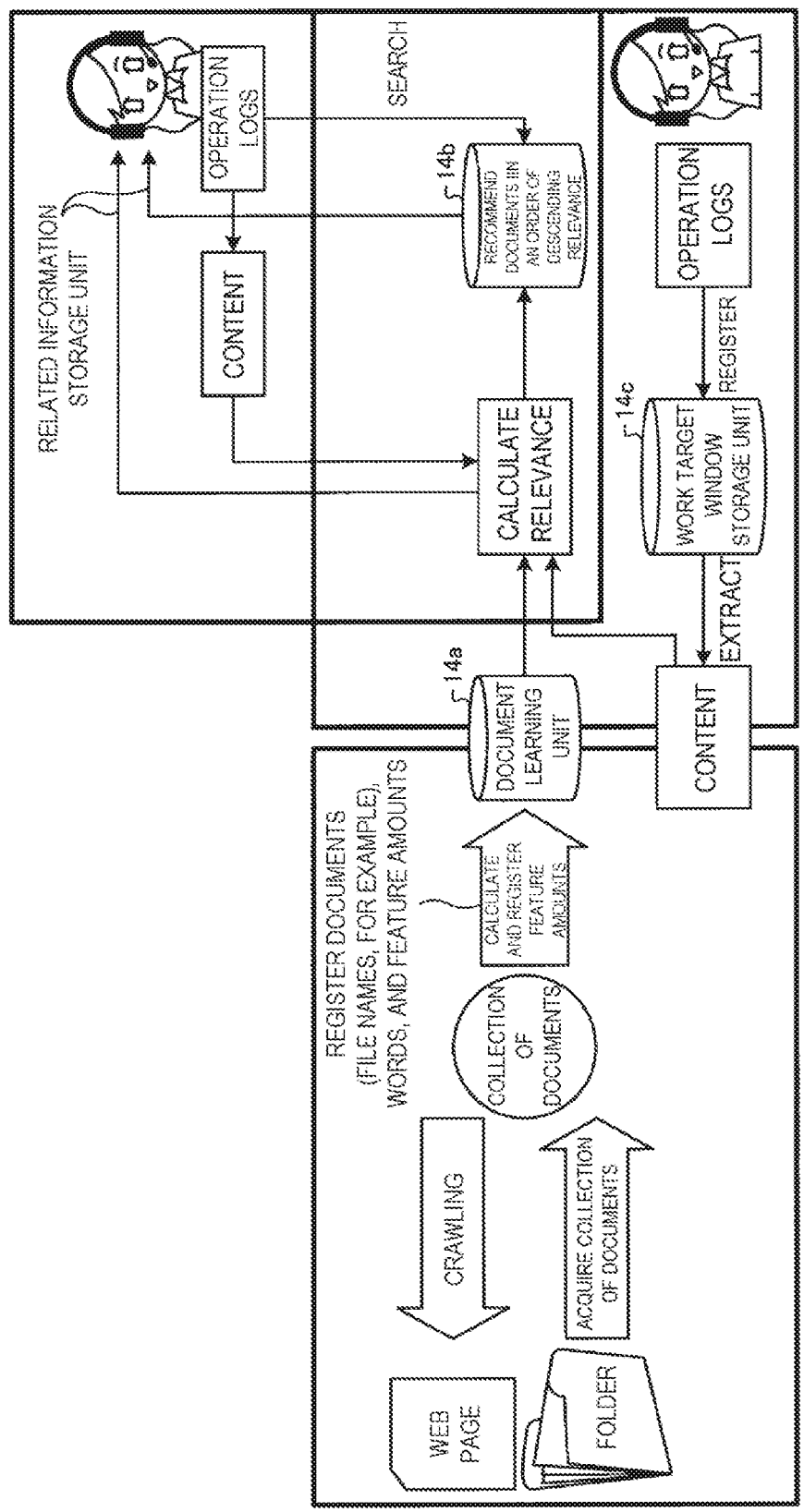
FIG. 19 is an explanatory diagram for explaining processing of a presentation apparatus according to another embodiment.

FIG. 19 is an explanatory diagram for explaining processing of a presentation apparatus 10 according to another embodiment. As shown as an example in FIG. 19, the relevance calculation unit 15f may further use the feature amounts of the words included in the documents to calculate relevances between the documents and the words included in the input operation logs in a case in which the similarities shown in FIG. 13 are less than a predetermined threshold value. In such a case, the presentation unit 15g presents, the user, a predetermined number of documents in an order of descending relevance calculated as related documents. In this way, it is possible to more appropriately present the related documents to the user by performing the processing of calculating the relevances again only in a case in which the similarity between the operation log that the user is operating and the operation logs in the related information storage unit 14b is low.

The embodiment is different from the embodiment shown in FIG. 13 in that the relevance calculation unit 15f calculates the relevance between the operation logs and the documents in the document learning unit 14a again in a case in which there are no operation logs with high similarities with the operation log that the user is operating in the related information storage unit 14*b*. Since the other matters are similar to those in the embodiment shown in FIG. 13, description thereof will be omitted.

Figure 20:
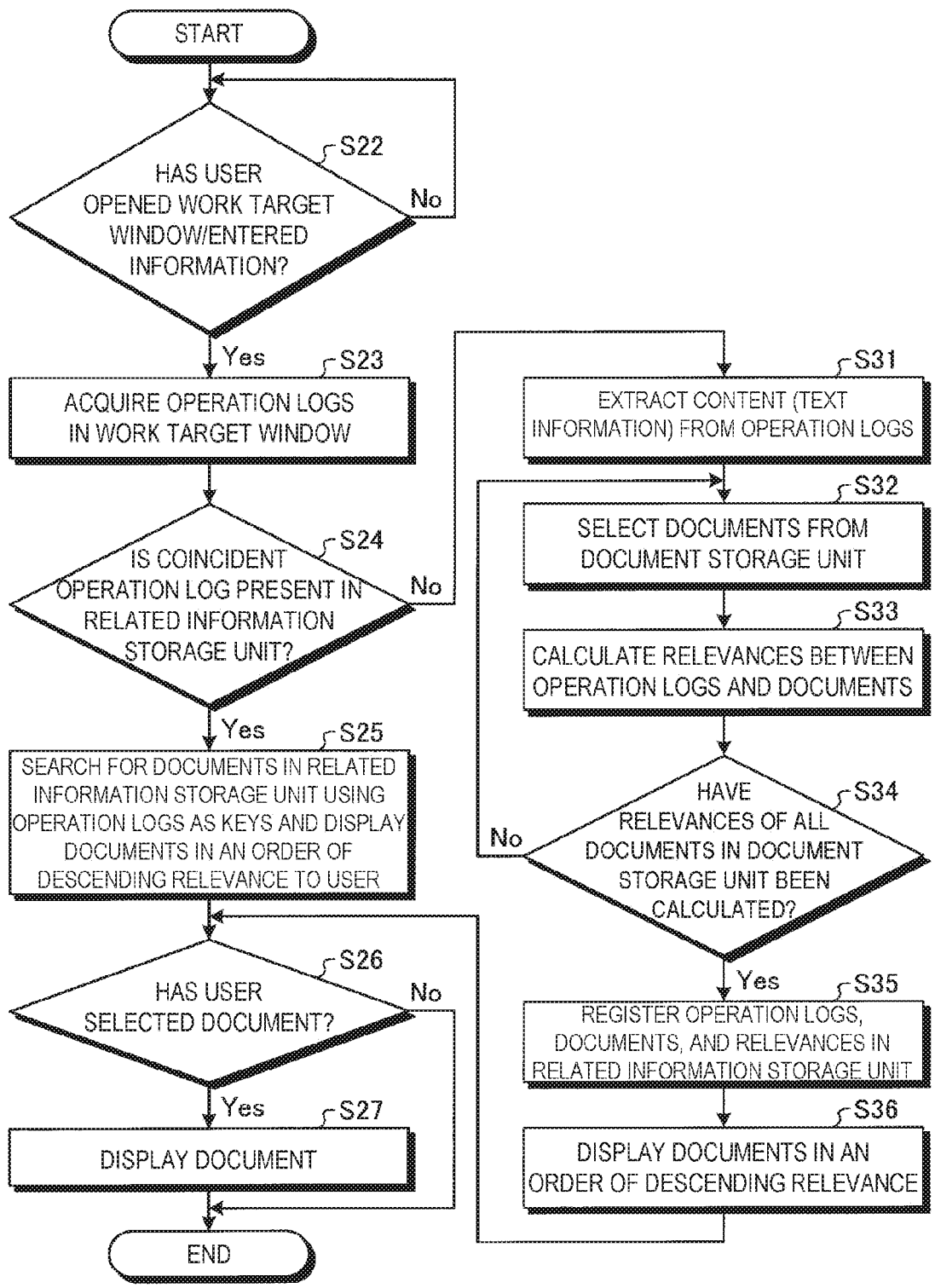
FIG. 20 is a flowchart showing a procedure for presentation processing performed by a presentation apparatus according to another embodiment.

FIG. 20 is a flowchart showing a procedure for presentation processing performed by the presentation apparatus in this case. Extraction processing in this case is different from that in the embodiment shown in FIG. 13 in the processing corresponding to Step S28 in the related document acquisition processing shown in FIG. 18. Specifically, the processing in Steps S31 to S36 is performed instead of the processing in Step S28 shown in FIG. 18 in the related document acquisition processing shown in FIG. 20. Since the other processing is similar to that in the processing in FIG. 18, description thereof will be omitted.

As shown in FIG. 20, in a case in which there are no operation logs that are coincident with or similar to the operation logs acquired by the presentation unit 15*g* (Step S24; No), the relevance calculation unit 15*f* extracts text information from the acquired operation logs again and separates the text information into words (Step S31). Also, the relevance calculation unit 15*f* selects documents in the document learning unit 14*a* (Step S32), calculates relevances between the selected documents and the operation logs and holds the relevances in the memory (Step S33).

The relevance calculation unit 15*f* checks whether the relevances have been calculated for all the documents in the document learning unit 14*a* (Step S34). In a case in which the relevances have not been calculated for all the documents (Step S34; No), the relevance calculation unit 15*f* returns the processing back to Step S32 and moves on to the processing In Step S35 in a case in which the relevances have been calculated for all the documents (Step S34; Yes).

In the processing in Step S35, the relevance calculation unit 15*f* registers the operation logs with the calculated relevances of the documents in an associated manner in the related information storage unit 14*b* (Step S35). The presentation unit 15*g* displays, for the user, a predetermined number of documents in an order of descending relevance as document candidates of the related documents via the output unit 12 (Step S36), moves on to the processing in Step S26, and displays related documents selected by the user for the user. In this manner, the series of related document acquisition processes end.

Program

A program in which the processing executed by the presentation apparatus 10 according to the aforementioned embodiments is described in a computer-executable language can also be created. In an embodiment, the presentation apparatus 10 can be implemented by causing a desired computer to install the presentation program configured to execute the aforementioned presentation processing as packaged software or on-line software. For example, it is possible to cause an information processing apparatus to function as the presentation apparatus 10 by causing the information processing apparatus to execute the aforementioned presentation program. The information processing apparatus described here includes a desktop or laptop personal computer. In addition, a mobile communication terminal such as a smartphone, a mobile phone, or a personal handyphone system (PETS), further a slate device such as a personal digital assistant (PDA), and the like are also included in the scope of the information processing apparatus.

The presentation apparatus 10 can be implemented as a server apparatus that provides services related to the aforementioned presentation processing to a client that is a terminal device used by a user. For example, the presentation apparatus 10 is implemented as a server apparatus that provides presentation processing services for outputting related documents using operation logs of a user terminal as inputs. In this case, the presentation apparatus 10 may be implemented as a web server or may be implemented as a cloud configured to provide services related to the aforementioned presentation processing through outsourcing. Hereinafter, an example of a computer that executes the presentation program that implements functions that are similar to those of the presentation apparatus 10 will be described.

Figure 21:
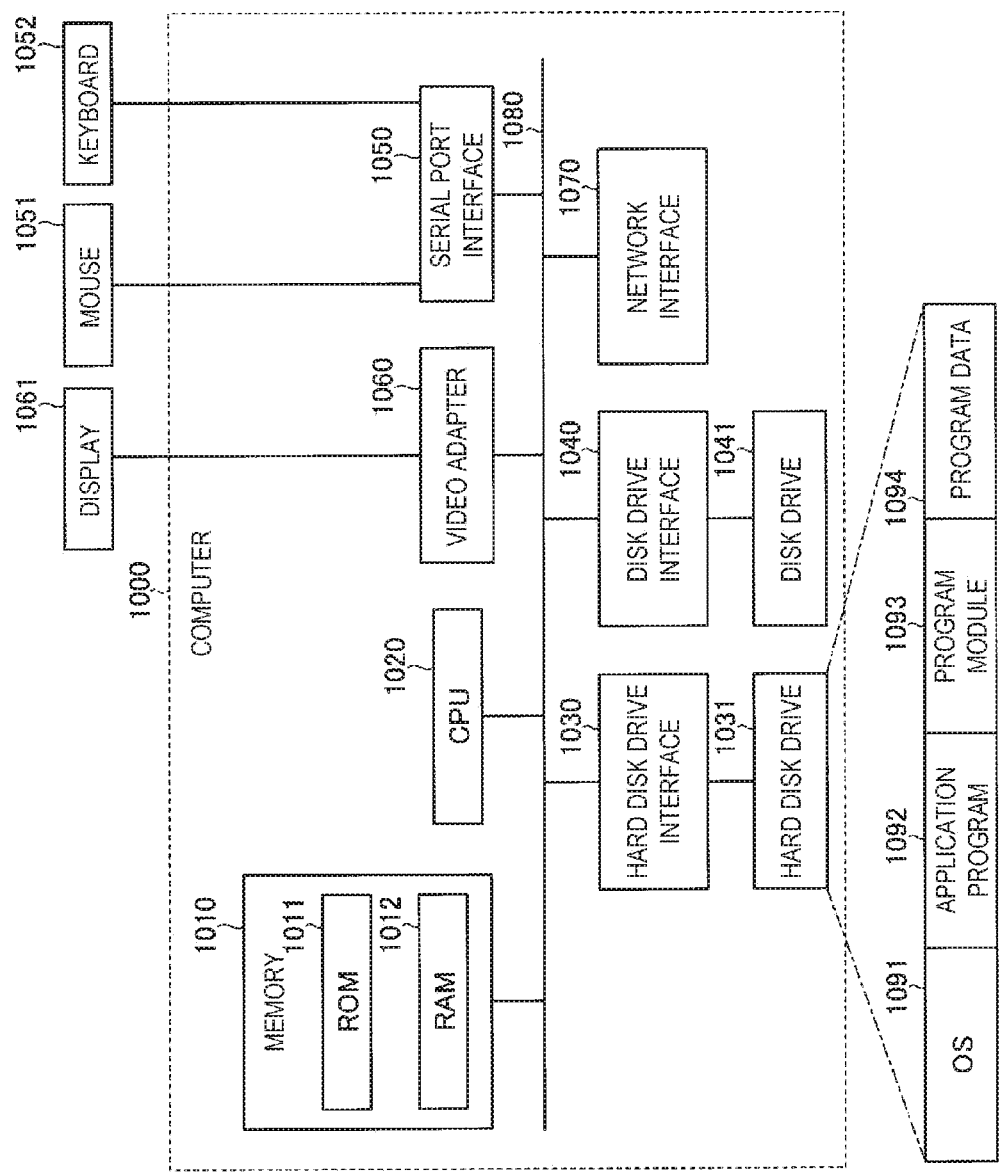
FIG. 21 is a diagram showing an example of a computer for executing a presentation program.

FIG. 21 is a diagram showing an example of the computer that executes the presentation program. A computer 1000 has, for example, a memory 1010, a CPU 1020, a hard disk drive interface 1030, a disk drive interface 1040, a serial port interface 1050, a video adapter 1060, and a network interface 1070. The respective components are connected via a bus 1080.

The memory 1010 includes read only memory (ROM) 1011 and a RAM 1012. The ROM 1011 stores a boot program such as a basic input output system (BIOS), for example. The hard disk drive interface 1030 is connected to the hard disk drive 1031. The disk drive interface 1040 is connected to a disk drive 1041. A detachable storage medium such as a magnetic disk or an optical disc, for example, is inserted into the disk drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. The respective information described in the aforementioned embodiments are stored in, for example, the hard disk drive 1031 and the memory 1010.

The presentation program is stored in the hard disk drive 1031 as, for example, the program module 1093 in which commands executed by the computer 1000 are described. Specifically, the program modules 1093 in which the respective processing executed by the presentation apparatus 10 as described in the aforementioned embodiments are described are stored in the hard disk drive 1031.

The data used in information processing performed using the presentation program is stored as the program data 1094 in the hard disk drive 1031, for example. Then, the CPU 1020 reads the program module 1093 and the program data 1094 stored in the hard disk drive 1031 as needed in the RAM 1012 and executes the aforementioned respective procedures.

Note that the program module 1093 and the program data 1094 related to the presentation program are not limited to the case in which they are stored in the hard disk drive 1031 and may be stored in a detachable storage medium, for example, and may be read by the CPU 1020 via the disk drive 1041, or the like. Alternatively, the program module 1093 and the program data 1094 related to the presentation program may be stored in another computer connected to a network such as a LAN or a wide area network (WAN) and may be read by the CPU 1020 via the network interface 1070.

Although the embodiments to which the invention made by the present inventors is applied have been described above, the invention is not limited by the description and the drawings as a part of the disclosure of the present invention based on the embodiments. In other words, all of other embodiments, examples, operation technologies, and the like made by those skilled in the art on the basis of the embodiments are within the scope of the invention.

REFERENCE SIGNS LIST

10 Presentation apparatus
11 Input unit
12 Output unit
13 Communication control unit
14 Storage unit
14a Document learning unit
14b Related information storage unit
14c Work target window storage unit
15 Control unit
15a Document collection unit
15b Related document presentation unit
15c Document acquisition unit
15d Feature amount calculation unit
15e Operation log acquisition unit
15f Relevance calculation unit
15g Presentation unit

The invention claimed is:

1. A presentation apparatus comprising:
a processor; and
a memory device storing instructions that, when executed by the processor, cause the processor to perform operations comprising:
collecting a plurality of documents;
for each document in the plurality of documents, calculating feature amounts of words included in the collected documents;
determining a word vector having a plurality of elements for a target window operated by a user, wherein a dimension of the word vector is a total number of types of words appearing in the collected documents, values of the elements corresponding to words included in operation logs generated for the target window are set to 1, and values of elements corresponding to words not included in the operation logs are set to 0;
for each document in the collected documents, using the word vector determined for the target window and the feature amounts of the words calculated for the document to calculate a respective relevance between the document and the operation logs for the target window; and
presenting, to the user, a predetermined number of the documents as related documents in an order of descending relevance.

2. The presentation apparatus according to claim 1, wherein determining the word vector for the target window further comprises:
for each word included in the operation logs, determining a distance between a location of the word in the target window and a user location of entry in the target window, and applying larger weights to the elements corresponding to words having distances equal to or less than a predetermined threshold value.

3. The presentation apparatus according to claim 1, wherein the operations further comprise:
associating the calculated relevances with the documents and the operation logs, storing the calculated relevances, the documents, and the operation logs in the storage a storage unit, calculating similarities between the operation logs and a newly input operation log with reference to the storage unit, and
presenting, to the user, the documents associated with a predetermined number of the operation logs in an order of descending similarity, as related documents.

4. The presentation apparatus according to claim 3, wherein the operations further comprise:
using the feature amounts of the words included in the documents to calculate the relevances between the documents and the words included in the input operation log in a case in which the similarities are less than a predetermined threshold value, and
presenting, to the user, the predetermined number of the documents in an order of descending relevance calculated, as the related documents.

5. The presentation apparatus according to claim 1, wherein calculating the feature amounts of words comprises:
calculating the feature amounts based on a number of appearances of the words included in the documents.

6. The presentation apparatus according to claim 1, wherein calculating the feature amounts of words comprises:
calculating the feature amounts based on distribution expressions of the words included in the documents.

7. A presentation method executed by a presentation apparatus, the method comprising:
collecting a plurality of documents;
calculating, for each document in the plurality of documents, feature amounts of words included in the collected documents;
determining a word vector having a plurality of elements for a target window operated by a user, wherein a dimension of the word vector is a total number of types of words appearing in the collected documents, values of the elements corresponding to words included in operation logs generated for the target window are set to 1, and values of the elements corresponding to words not included in the operation logs are set to 0;
for each document in the collected documents, using the word vector determined for the target window and the feature amounts of the words calculated for the document to calculate relevances a respective relevance between the document and the operation logs for the target window; and
presenting, to the user, a predetermined number of the documents in an order of descending relevance, as related documents.

8. A non-transitory computer readable medium storing instructions that when executed by a computer cause the computer to execute perform operations comprising:
collecting a plurality of documents;
calculating, for each document in the plurality of documents, feature amounts of words included in the collected documents;
determining a word vector having a plurality of elements for a target window operated by a user, wherein a dimension of the word vector is a total number of types of words appearing in the collected documents, values of the elements corresponding to words included in operation logs generated for the target window are set to 1, and values of the elements corresponding to words not included in the operation logs are set to 0;
for each document in the collected documents, using the word vector determined for the target window and the feature amounts of the words calculated for the document to calculate a respective relevance between the respective document and the operation logs for the target window; and presenting, to the user, a predetermined number of the documents in an order of descending relevance, as related documents.

9. The presentation method according to claim 7, wherein determining the word vector for the target window further comprises:

for each word included in the operation logs, determining a distance between a location of the word in the target window and a user location of entry in the target window, and applying larger weights to the elements corresponding to words having distances equal to or less than a predetermined threshold value.

10. The presentation method according to claim 7 further comprising:

associating the calculated relevances with the documents and the operation logs;

storing the calculated relevances, the documents, and the operation logs in a storage unit;

calculating similarities between the operation logs and a newly input operation log with reference to the storage unit; and presenting, to the user, the documents associated with a predetermined number of the operation logs in an order of descending similarity, as related documents.

11. The presentation method according to claim 10, further comprising:

using the feature amounts of the words included in the documents to calculate the relevances between the documents and the words included in the input operation log in a case in which the similarities are less than a predetermined threshold value, and wherein the order of descending relevance comprises an order of descending relevance calculated.

12. The presentation method according to claim 7, wherein calculating the feature amounts of words comprises:

calculating the feature amounts of words included in the acquired collected documents based on a number of appearances of the words included in the documents.

13. The presentation method according to claim 7, wherein calculating the feature amounts of words comprises:

calculating the feature amounts of words included in the collected documents based on distribution expressions of the words included in the documents.

14. The non-transitory computer readable medium according to claim 8, wherein determining the word vector for the target window further comprises:

for each word included in the operation logs, determining a distance between a location of the word in the target window and a user location of entry in the target window, and applying larger weights to the elements corresponding to words having distances equal to or less than a predetermined threshold value.

15. The non-transitory computer readable medium according to claim 8, wherein the operations further comprise:

associating the calculated relevances with the documents and the operation logs;

storing the calculated relevances, the documents, and the operation logs in a storage unit;

calculating similarities between the operation logs and a newly input operation log with reference to the storage unit; ands presenting, to the user, the documents associated with a predetermined number of the operation logs in an order of descending similarity, as related documents.

16. The non-transitory computer readable medium according to claim 15, wherein the operations further comprises:

using the feature amounts of the words included in the documents to calculate the relevances between the documents and the words included in the input operation log in a case in which the similarities are less than a predetermined threshold value, and wherein the order of descending relevance comprises an order of descending relevance calculated.

17. The non-transitory computer readable medium according to claim 8, wherein calculating the feature amounts of words comprises:

calculating the feature amounts of words included in the collected documents based on a number of appearances of the words included in the documents.

18. The non-transitory computer readable medium according to claim 8, wherein calculating the feature amounts of words comprises:

calculating the feature amounts of words included in the collected documents based on distribution expressions of the words included in the documents.

* * * * *